Patented Mar. 22, 1949

2,464,825

UNITED STATES PATENT OFFICE 2,464,825

CATALYSTS FOR OXIDIZING FURFURAL AND PREPARATION THEREOF

Erik R. Nielsen, Chicago, Ill., assignor to The Quaker Oats Company, Chicago, Ill., a corporation of New Jersey No Drawing. Original application May 13, 1944, Serial No. 535,565, now Patent No. 2,421,428, dated June 3, 1947. Divided and this application September 11, 1946, Serial No. 696,375

18 Claims. (Cl. 252—228.2)

The present invention relates to improvements in catalysts for oxidizing furfural, particularly while the same is in vapor form, for the particular purpose of producing therefrom maleic anhydride and maleic acid, and to methods of preparing the same, being a division of my application Serial No. 535,565, filed May 13, 1944, now Patent No. 2,421,428, dated June 3, 1947.

It has been proposed to subject furfural in vapor form to oxidation by means of an oxygen-containing gas while passing the mixture of furfural vapor in said gas at an elevated temperature over catalysts containing vanadium.

In processes of that type, however, the yields have not been particularly high, and the control of the process has been somewhat difficult. The particular difficulties have resided in the preparation and activation of the catalyst, and more particularly with the methods of coating a suitable carrier with the catalyst. For instance, the conventional method of coating a carrier with a suitable catalyst has been to stir and evaporate a suspension of the catalyst to dryness in the presence of the carrier. Such a method, however, is open to the objection that the vessel used in the coating operation is thus subjected to the abrasive action of the carrier with the result that the finished catalyst becomes contaminated by material mechanically abraded from the material out of which the vessel is constructed. Suggestions have been made to spray, for instance, an aqueous or other liquid suspension of a catalyst on to the carrier particles and then to force-dry the thus sprayed carrier particles. An alternative proposal has been first to preheat the carrier particles to such an extent that the suspension when sprayed thereon will be dried upon contact with the carrier as a result of the heat of the latter. The most serious objection to such a spraying procedure, however, is that it is difficult if not impossible, particularly in the case of catalysts containing suspended materials, to produce an even spray. Moreover, the connections between the supply tank and the spray nozzle tend to become plugged by settling out of the suspended material with the result that the spray is uneven, with resulting unevenness and lack of uniformity of the catalyst.

In accordance with the present invention a number of new steps are taken in order to provide a suitable catalyst for the vapor phase oxidizing of furfural. Among the objects of the invention are:

The production of a catalyst for the vapor phase oxidation of furfural which comprises forming a catalyst and its promotor on a supporting material and activating the thus supported catalyst by the passage of oxygen-containing gas thereover at a temperature which is from about 10° to 50° C. higher than the temperature at which the catalyst will be used for effecting the desired oxidation;

The process of activating a catalyst of the type already mentioned in which the activation is carried out in passageways or in a container provided with a nickel surface;

The process of coating a carrier with a catalyst suitable for the vapor phase oxidation of furfural which comprises the steps of producing an aqueous suspension of the catalytically active materials, and emulsifying into said suspension liquid furfural, thereby thickening the suspension, and admixing the resulting heavy emulsion with the carrier, and then drying the mixture and activating the same;

The process of producing a catalyst for the vapor phase oxidation of furfural which comprises producing an aqueous suspension of a suitable promoter, for example, iron molybdate, and then adding ammonium metavanadate, ammonium molybdate and phosphoric acid neutralized with ammonia to the suspension, dispersing furfural in the suspension to produce an emulsion, and then admixing the resulting emulsified product with an inert catalyst carrier, drying the mixture and activating the resulting coated carrier and the catalyst held thereon by heating the same for a prolonged time at a temperature within the range of from about 270° C. to 320° C. in a current of an oxygen-containing gas.

A catalyst formed in the manner described.

Other objects of the present invention will become apparent from the further description and the hereunto appended claims.

Thus I have found that particular advantage resides in forming the catalytic materials in a suspension and then converting the said suspension into an emulsion by the addition of furfural. Such an emulsion may then be admixed with a suitable carrier which can then be spread out and allowed to dry at room temperatures. Such drying does not produce any visible degradation of the emulsion.

Moreover, it has been found that if a promoter is to be incorporated with the catalyst, such promoter is far more efficacious if it is initially formed in the suspension in which the catalyst itself is formed. Such formation of the promoter in the catalyst suspension is termed, in accordance with the present invention, as forming the promoter "in situ," so as to contrast it with the mere physical admixture of the promoter with the suspension of the catalyst. It was found that a promoter produced in situ yields a catalyst which cures at a much faster rate than an otherwise entirely similar catalyst in which the promoter had been separately prepared and then added as a finely divided powder to the other catalyst components. It will be realized by those skilled in this art that any procedure which will tend to shorten the length of the curing period is of great importance because catalysts of the type here under discussion must be cured for a considerable length of time before they will produce the optimum yield of the desired oxidation products, for example, maleic anhydride and maleic acid.

Furthermore it has been found that, contrary to reasonable expectations, the curing time may be shortened by curing the catalyst at a temperature which is above that at which the cured catalyst, when used for the vapor phase oxidation of furfural, will produce the optimum yields.

I have found that the surface of which the catalyst chamber or catalyst tubes are made has a decided effect upon the yield of the desired oxidation product. Thus, the same catalyst will produce about 25 per cent higher yields of maleic acid or its anhydride from furfural when the chamber has a nickel surface instead of a steel or iron surface.

The catalysts comprised within contemplation of the present invention, in general, may be considered as consisting of reaction products of the heating of a mixture of ammonium metavanadate and ammonium molybdate together with ammonium phosphate and an excess of ammonium hydroxide; the catalyst being further improved by the presence of such promoters as aluminum hydroxide, iron hydroxide, iron phosphate, iron molybdate, various oxides of arsenic, boric acid, alkalies such as potassium hydroxide or sodium hydroxide, or alkaline earth hydroxides such as are exemplified by calcium hydroxide. A mixture of the various promoters may be used. Moreover, the catalyst can be further improved by the presence therein of a reaction product produced by incorporating ammonium tungstate therewith.

While the exact composition of the catalyst defies analysis, it can easily be defined in terms of the chemicals or chemical compounds which are employed in its production. Where phosphoric acid is mentioned in connection with the production of these catalysts, it is to be understood that the said phosphoric acid is first neutralized to litmus by means of ammonium hydroxide, whereafter the mixture is rendered decidedly alkaline with ammonium hydroxide. A catalyst may, for instance, be made from 20 parts of ammonium vanadate, 10 parts of ammonium molybdate, 5 parts of ammonia-neutralized phosphoric acid, an excess of ammonium hydroxide, and about 0.2 part of aluminum hydroxide. (All parts are by weight.)

Another example is one made from 20 parts of ammonium vanadate, 10 parts of ammonium molybdate, 3.4 parts of ammonia-neutralized phosphoric acid, an excess of ammonium hydroxide, and 5 parts of iron phosphate.

Another example is a catalyst prepared from 20 parts of ammonium vanadate, 5 parts of ammonium molybdate, 5 parts of ammonia-neutralized phosphoric acid, 10 parts of ammonium tungstate, 5 parts of iron molybdate, and 1 part of arsenic trioxide.

A further example is a catalyst prepared from 200 parts of ammonium vanadate, 50 parts of ammonium molybdate, 17 parts of ammonia-neutralized phosphoric acid, 10 parts of boric acid, and 1 part of potassium hydroxide.

Still another example is a catalyst made from 20 parts of ammonium vanadate, 5 parts of ammonium molybdate, 1.5 parts of ammonia-neutralized phosphoric acid, 10 parts of ammonium tungstate, and 1 part of boric acid.

A particularly good catalyst, however, may be prepared in accordance with the following example, which is to be considered as the preferred form in connection with the present invention, and which is given in greater detail in order to set forth the various advantages to be derived from the formation of the promoter, in this case iron molybdate, in situ, as already mentioned, while the example also demonstrates the advantages accruing from the formation of a furfural emulsion from the suspension of the catalytic and promoting materials. The preferred catalyst therefore is prepared as follows:

24.5 parts by weight of ferric nitrate $$(Fe(NO_3)_3 9H_2O)$$

are dissolved in 50 parts by weight of water. In a glass, glass-lined or ceramic vessel there is also prepared a solution by dissolving 21.5 parts of ammonium molybdate $((NH_4)_6Mo_7O_{24}, 4H_2O)$ in 100 parts by weight of water. Instead of the ferric nitrate already referred to, any other soluble ferric salts may be used. In any event, the solutions of the iron salt and of the ammonium molybdate are mixed with each other, resulting in the formation of a canary yellow suspension of iron molybdate. The iron molybdate in this case is the promoter. Into this suspension there is then incorporated, while thoroughly mixing, a dry mixture consisting of 200 parts by weight of ammonium metavanadate, and 50 parts by weight of ammonium molybdate. After this mixture has been incorporated with the iron molybdate suspension, there is then added 200 parts by weight of a 28 per cent solution of ammonia, whereupon 50 parts of 85% phosphoric acid, which has in advance been neutralized to litmus with ammonium hydroxide, is introduced into the thus far formed suspension of ingredients. Into the alkaline-reacting suspension thus formed, 165 parts by weight of furfural are gradually introduced with thorough agitation so as to disperse the furfural as a disperse phase in the suspension. The result of these operations is the formation of a heavy creamy emulsion. Into this emulsion there are then introduced 3000 parts by weight of a ceramic carrier, of a size between 8 and 16 mesh. The incorporation of the carrier with the heavy emulsion produces granules thoroughly coated with the emulsion. The resulting mixture is then spread out thin upon suitable supports which must not be made of iron, and the mixture is then allowed to dry at room temperature.

This produces the desired catalyst which, however, still requires curing and activation. To accomplish this, 250 parts of the dried catalytic material, that is to say, the carrier, coated with the catalytic material, are placed in a converter having a nickel surface, whereafter air is passed over the material in the converter at a temperature of about 300° C. for a period of 40 days. At the end of this activating or curing period the catalyst is then ready for use as a vapor phase oxidation catalyst of furfural.

To produce maleic acid and maleic anhydride from this catalyst, for example, a furfural-air mixture containing about one per cent of furfural by volume, is preheated to the operating temperature for the catalyst (270° C.) and passed over the catalyst at a rate so as to give a contact time of from about 0.2 to one second. The heat of reaction is removed in heat exchange with a suitable medium such as "Dowtherm" (which is a mixture consisting essentially of diphenyl and diphenyloxide). It will be noticed that the temperature at which the catalytic conversion is effected is about 30 degrees lower than the temperature at which the catalyst has been cured.

A catalyst prepared and cured in the manner just described is capable of yielding as much as 71 per cent of theory of maleic acid and maleic anhydride. After a two months' operation the yield gradually increases to about 80 per cent of theory and at the end of 300 days yields as high as 81 per cent of theory have been obtained.

In order to recover the maleic acid or maleic anhydride, or both, from the effluent flowing from the converter, the heated gases containing the maleic anhydride are passed upwardly through a suitably packed tower, for instance, one filled with small porcelain Raschig rings, while water is allowed to pass downwardly counter-current to the ascending gases. This water will dissolve the maleic anhydride, yielding a solution of maleic acid which may then be collected and from which maleic acid and maleic anhydride can be recovered by ways well known to those skilled in the art to which the present invention relates.

In order to demonstrate the value of forming the promoter in situ, comparisons have been made between a catalyst prepared as just described in connection with the preferred example using the same proportions of materials, except that the iron molybdate, instead of being precipitated, as described in the preferred example, was separately prepared, filtered from its mother liquid, washed and dried, and then incorporated with the other ingredients by being stirred into the suspension of the ammonium metavanadate, ammonium molybdate, and neutralized phosphoric acid plus excess ammonium hydroxide. Moreover, the catalyst thus prepared was spread over a suitable support, dried, and cured in the same manner. At the end of 60 days, however, a catalyst thus made was capable of yielding only about 53 per cent of theory as compared with about 75 percent of theory (average) of a catalyst which had been prepared in accordance with the prefered example, i. e. with the promoter formed in situ.

In order to demonstrate the value of curing the catalyst at a temperature higher than that at which it will be used and also to show the critical nature of the rather narrow range of temperatures in which such curing can be effected, five batches of catalyst, all prepared exactly in accordance with the preferred example herein above given, were cured at the following temperatures: No. 1 at 270° C., No. 2 at 300° C., No. 3 at 325° C., No. 4 at 350° C., and No. 5 at 375° C. In all cases the curing period was one month. The catalysts thus prepared were tested for their ability to produce maleic acid and maleic anhydride. The results were as follows: Catalyst No. 1 yielded 62% of theory; catalyst No. 2 (the one cured at 300° C.) produced 72% of theory; catalyst No. 3 yielded 68% of theory; catalyst No. 4 yielded 52% of theory; and catalyst No. 5 yielded only 33% of theory. This therefore shows that temperatures not exceeding 325° C. are satisfactory, but that when the temperature is above 325° C. the effect is deleterious. Inasmuch as 270° C. is the preferred temperature for the vapor phase oxidation of the furfural to maleic acid and maleic anhydride, the temperature within the range of from 10° to 50° over and above that used for the catalytic conversion is suitable for the curing of the catalyst. In other words, this range has been demonstrated as being critical.

In order to demonstrate the importance of the proper choice of the material to be used in the construction of the converter, two converters were made of identical design, but one was made from aluminum and the other from steel. Each was charged with the same amount of catalyst from the same batch. The catalysts were cured in the identical manner and then after 60 days they were tested for their ability to convert furfural into maleic acid and maleic anhydride. The aluminum converter was capable of producing 58 per cent of maleic acid, while the one in which steel tubes were used produced only 42 per cent. Using an aluminum converter on the one hand and comparing it with the steel converter, the interior of which has been sprayed with 18-8 stainless steel, gave a yield of about 58 per cent which was the same as that of the aluminum converter.

However, a final comparison was made in which the converter was made of such materials that its interior surfaces consisted of or contained metallic nickel, and it was found that the nickel converter gave a 7 per cent higher yield of maleic acid from furfural than when an aluminum converter had been used.

The temperature of the catalyst-containing converter tubes should be under close control. This can very advantageously be attained by immersing the tubes in a bath of a suitable liquid heating medium, for example, diphenyl or a mixture of diphenyl and diphenyl oxide, or some low melting metal which is a good heat transferring agent. It is also advantageous to preheat the air so that there will be no chilling effect as it passes over the catalyst. Furthermore, heated air is very advantageous as a carrier medium for introducing the furfural vapor at a proper state of dilution into the converter tubes.

Inasmuch as converters of this general type are well known, having been used in connection with the oxidation of other organic substances in vapor phase, for example, benzene, it is not believed necessary to illustrate these converters. In general they are of the type described by C. R. Downs in U. S. Patent No. 1,604,739.

While the invention has been described in considerable detail, particularly in connection with one example, it is of course to be understood that this is without intention in any wise to limit the invention beyond the scope of the hereunto appended claims.

Accordingly I claim:

1. Catalyst for oxidation of furfural wherein the catalytically active ingredients consist essentially of the reaction products resulting from heating a mixture of ammonium vanadate, ammonium molybdate, ammonium phosphate, and ammonium hydroxide and containing a promoter.

2. Catalyst for oxidation of furfural wherein the catalytically active ingredients consist essentially of the reaction products resulting from heating a mixture of ammonium vanadate, ammonium molybdate, ammonium phosphate, ammonium tungstate, and amonium hydroxide and containing a promoter.

3. Catalyst for oxidation of furfural wherein the catalytically active ingredients consist essentially of the reaction products resulting from heating a mixture of about 20 parts of ammonium vanadate, about 10 parts of ammonium molybdate, about 5 parts of ammonia-neutralized phosphoric acid, an excess of ammonium hydroxide and about 0.2 part of aluminum hydroxide.

4. Catalyst for oxidation of furfural wherein the catalytically active ingredients consist essentially of the reaction products resulting from heating a mixture of about 20 parts of ammonium vanadate, about 10 parts of ammonium molybdate, about 5 parts of ammonia-neutralized phosphoric acid, an excess of ammonium hydroxide and about 5 parts of iron phosphate.

5. A catalyst for oxidation of furfural wherein the catalytically active ingredients consist essentially of iron molybdate, and the reaction products of ammonium phosphate, ammonia, ammonium metavenadate and ammonium molybdate, activated by an oxygen-containing gas at a temperature within the range of about 270° C. to 320° C.

6. Process of producing a catalyst for the vapor phase oxidation of furfural which comprises forming the catalyst comprising ammonium molybdate, ammonium vanadate, ammonium phosphate, excess ammonia, and a promoter on a supporting material and activating the catalyst by the passage of heated oxygen-containing gases thereover at an elevated temperature.

7. Process of activating a catalyst comprising ammonium molybdate, ammonium vanadate, ammonium phosphate, excess ammonia, and a promoter suitable for the vapor-phase oxidation of furfural which comprises heating said catalyst in a converter having a nickel surface in contact with the catalyst while curing said catalyst by the passage thereover of an oxygen-containing gas.

8. Process of coating a carrier with a catalyst suitable for the vapor-phase oxidation of furfural which comprises the steps of producing an aqueous suspension of the catalytically active materials including ammonium molybdate, ammonium vanadate, ammonium phosphate, excess ammonia and a promoter, emulsifying furfural with said suspension, admixing the resulting emulsion with the carrier, and drying the mixture.

9. Process of producing a catalyst for the vapor-phase oxidation of furfural which comprises producing an aqueous suspension of iron molybdate, ammonium metavanadate, ammonium molybdate, ammonium phosphate and excess ammonia dispersing furfural in said suspension to produce an emulsion, admixing the emulsion with an inert catalyst-carrier, drying the mixture, and activating the resulting product by heating the same for a prolonged time to a temperature of from about 270° C. to about 320° C. in a current of an oxygen-containing gas.

10. The process of claim 9 in which the activation of the catalyst is effected in a confined space and having nickel surfaces in contact with the catalytic material being activated.

11. In the process of preparing a catalyst suitable for the vapor-phase oxidation of furfural to maleic acid and maleic anhydride the step which comprises producing the promoter for the catalyst in situ by precipitating an aqueous soluble iron salt by means of a soluble molybdate to produce a precipitate of iron molybdate, incorporating ammonium phosphate, excess ammonia, ammonium metavanadate and ammonium molybdate with the resulting suspension, spreading the same on a suitable inert carrier, drying the same thereon and activating the thus coated carrier by the passage thereover of an oxygen-containing gas at a temperature of from about 270° to 320° C.

12. In the process of producing a catalyst for the vapor-phase oxidation of furfural to maleic acid and maleic anhydride the step of forming a catalyst-promoter precipitate in an aqueous suspension, adding ammonium molybdate, ammonium vanadate, ammonium phosphate and excess ammonia to said aqueous suspension, coating an inert carrier with the resulting mixture, and drying and activating the coated carrier.

13. A process of producing a catalyst for the vapor phase oxidation of furfural which comprises adding to a suspension of iron molybdate, a mixture of ammonium metavanadate and ammonium molybdate, followed by ammonium phosphate and ammonium hydroxide and thereafter drying and activating with an oxygen containing gas.

14. A process for producing a catalyst for the vapor phase oxidation of furfural comprising the addition of ammonium metavanadate, ammonium molybdate, ammonia and ammonium phosphate to a suspension of a promoter precipitate, said precipitate having been formed in the suspension to which the other ingredients are added and thereafter drying and activating with an oxygen-containing gas.

15. The process of claim 14 in which ammonium tungstate is added together with ammonium metavanadate.

16. A process of producing a catalyst for the vapor phase oxidation of furfural wherein the catalytically active ingredients consist essentially of ammonium vanadate, ammonium molybdate, ammonium phosphate, excess ammonia and a promoter which comprises placing the catalyst in a converter having a nickel surface in contact with the catalyst and curing said catalyst in an oxygen containing gas at a temperature higher than the temperature at which the highest yield of maleic acid or anhydride from furfural is obtained.

17. Process of producing a catalyst for the vapor phase oxidation of furfural which comprises producing an aqueous suspension of iron molybdate and ammonium metavanadate in the presence of excess ammonia ammonium molybdate and ammonium phosphate derived by the neutralization to litmus of phosphoric acid by means of ammonium hydroxide, dispersing furfural in said suspension to produce an emulsion, admixing the emulsion with an inert catalyst-carrier, drying the mixture, and activating the resulting product by heating the same for a prolonged period of time to a temperature of from about 270° C. to about 320° C. in a current of an oxygen-containing gas.

18. In the process of preparing a catalyst suitable for the vapor phase oxidation of furfural to maleic acid and maleic anhydride the step which comprises producing the promoter for the catalyst in situ by precipitating an aqueous soluble iron salt by means of a soluble molybdate to produce a precipitate of iron molybdate, incorporating excess ammonia ammonium metavanadate, ammonium molybdate and ammonium phosphate, the latter being prepared by the neutralization to litmus of phosphoric acid by means of ammonium hydroxide, with the resulting suspension, spreading the same on a suitable inert carrier, drying the same thereon and activating the thus coated carrier by the passage thereover of an oxygen-containing gas at a temperature of from about 270° C. to about 320° C.

ERIK R. NIELSEN.

REFERENCES CITED

The following references are of record in the file of this patent:

UNITED STATES PATENTS

| Number | Name | Date |
| --- | --- | --- |
| 1,895,522 | Punnett | Jan. 31, 1933 |
| 2,142,678 | Porter | Jan. 3, 1939 |
| 2,260,409 | Slotterbeck et al. | Oct. 28, 1941 |
| 2,294,130 | Porter | Aug. 25, 1942 |